United States Patent
Radesky et al.

(10) Patent No.: US 10,172,343 B2
(45) Date of Patent: *Jan. 8, 2019

(54) TWO-DOOR CAGE TRAP WITH OVER-CENTER SET MECHANISM

(71) Applicant: WOODSTREAM CORPORATION, Lititz, PA (US)

(72) Inventors: Joseph A. Radesky, Lititz, PA (US); Christopher J. Kamery, Lancaster, PA (US); Marko Konstantin Lubic, Shillington, PA (US); Christopher T. Rich, Leola, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/234,131

(22) Filed: Aug. 11, 2016

(65) Prior Publication Data

US 2017/0156307 A1    Jun. 8, 2017

Related U.S. Application Data

(63) Continuation of application No. 14/153,921, filed on Jan. 13, 2014, now Pat. No. 9,420,777, which is a continuation of application No. 13/594,257, filed on Aug. 24, 2012, now Pat. No. 8,627,595, which is a continuation of application No. 13/317,653, filed on Oct. 25, 2011, now Pat. No. 8,250,802, which is a continuation of application No. 12/292,218, filed on Nov. 13, 2008, now Pat. No. 8,046,953, which is a continuation-in-part of application No. 11/160,085, filed on Nov. 16, 2006, now Pat. No. 7,757,427.

(51) Int. Cl.
 *A01M 23/18* (2006.01)
 *E05F 1/00* (2006.01)
 *E05F 1/12* (2006.01)

(52) U.S. Cl.
 CPC ............. *A01M 23/18* (2013.01); *E05F 1/002* (2013.01); *E05F 1/123* (2013.01)

(58) Field of Classification Search
 CPC .................................................. A01M 23/18
 See application file for complete search history.

(56) References Cited

U.S. PATENT DOCUMENTS

| 1,410,738 | A | 3/1922 | Doreseth |
| 1,444,934 | A | 2/1923 | Miller |
| 1,453,795 | A | 5/1923 | Hovell |

(Continued)

*Primary Examiner* — Christopher P Ellis
(74) *Attorney, Agent, or Firm* — Jacobson Holman, PLLC.

(57) ABSTRACT

A cage-type animal trap with two opposed animal access openings that can operate in a one-door-opening configuration or a two-door-opening configuration. The trap has a set mechanism for holding one or both doors open to allow access through the corresponding trap access openings. The set mechanism includes a set lever that is movable from a set position to a tripped position and that is coupled to the doors of the trap by an actuating member. Upon actuation, the set lever moves from the set to the tripped position to allow movement of the actuating member which enables one of the doors to move from an opened position to a closed position when the trap is operating in a one-door-opening configuration, and both of the doors to move from the opened position to the closed position when the trap is operating in the two-door-opening configuration.

20 Claims, 16 Drawing Sheets

(56) References Cited

U.S. PATENT DOCUMENTS

| | | |
|---|---|---|
| 1,453,796 A | 5/1923 | Hovell |
| 1,454,998 A | 5/1923 | Haege |
| 1,765,081 A | 6/1930 | Lee |
| 2,488,202 A | 11/1949 | Kern |
| 2,524,504 A | 10/1950 | Woolworth |
| 2,562,809 A | 7/1951 | Mogren |
| 2,586,110 A | 2/1952 | Stilborn |
| 2,611,989 A | 9/1952 | Larson |
| 2,616,210 A | 11/1952 | Reeb |
| 2,620,589 A | 12/1952 | Joney |
| 2,752,722 A | 7/1956 | Gardner |
| 2,825,176 A | 3/1958 | Floied |
| 3,113,395 A | 12/1963 | Van Kuren |
| 3,190,030 A | 6/1965 | Gilbaugh |
| 3,834,063 A | 9/1974 | Souza et al. |
| 3,913,258 A | 10/1975 | Souza et al. |
| 4,080,749 A | 3/1978 | Gilbaugh |
| 4,159,590 A | 7/1979 | Palfalvy |
| 4,162,588 A | 7/1979 | Wyant |
| 4,179,835 A | 12/1979 | Hunter |
| 4,254,976 A | 3/1981 | Shoberg |
| 4,341,033 A | 7/1982 | Siegel |
| 4,342,172 A | 8/1982 | Guanci |
| 4,546,568 A | 10/1985 | Seyler |
| 4,682,440 A | 7/1987 | Hunter |
| 4,682,441 A | 7/1987 | Straver |
| 4,707,943 A | 11/1987 | Beningo |
| 4,899,484 A | 2/1990 | Morin |
| 4,912,872 A | 4/1990 | Wynn |
| 5,329,723 A | 7/1994 | Liul |
| 5,345,710 A | 9/1994 | Bitz |
| 5,615,514 A | 4/1997 | Meade, Jr. |
| 5,778,594 A | 7/1998 | Askins |
| 5,845,432 A | 12/1998 | Tully et al. |
| 5,862,624 A | 1/1999 | Askins |
| 5,864,982 A | 2/1999 | Tully et al. |
| 6,484,436 B1 | 11/2002 | Chang |
| 6,609,327 B2 | 8/2003 | Stolen et al. |
| 6,658,788 B1 | 12/2003 | Steinfest |
| 2003/0019148 A1 | 1/2003 | Kao et al. |
| 2003/0230025 A1 | 12/2003 | Steinfest |
| 2006/0218849 A1 | 10/2006 | Rich et al. |
| 2008/0115405 A1 | 5/2008 | Bucher |
| 2011/0005122 A1 | 1/2011 | Bucher |

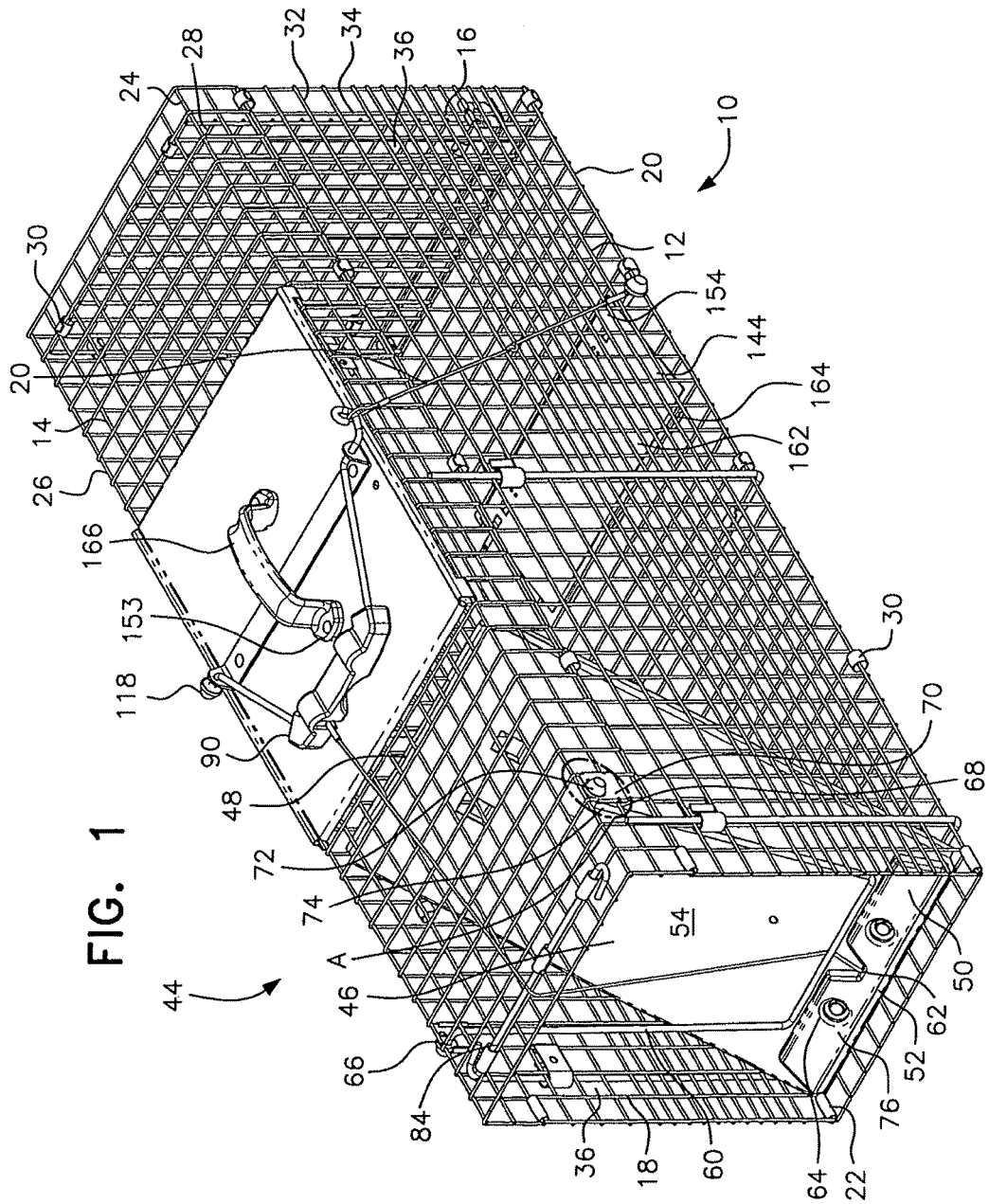

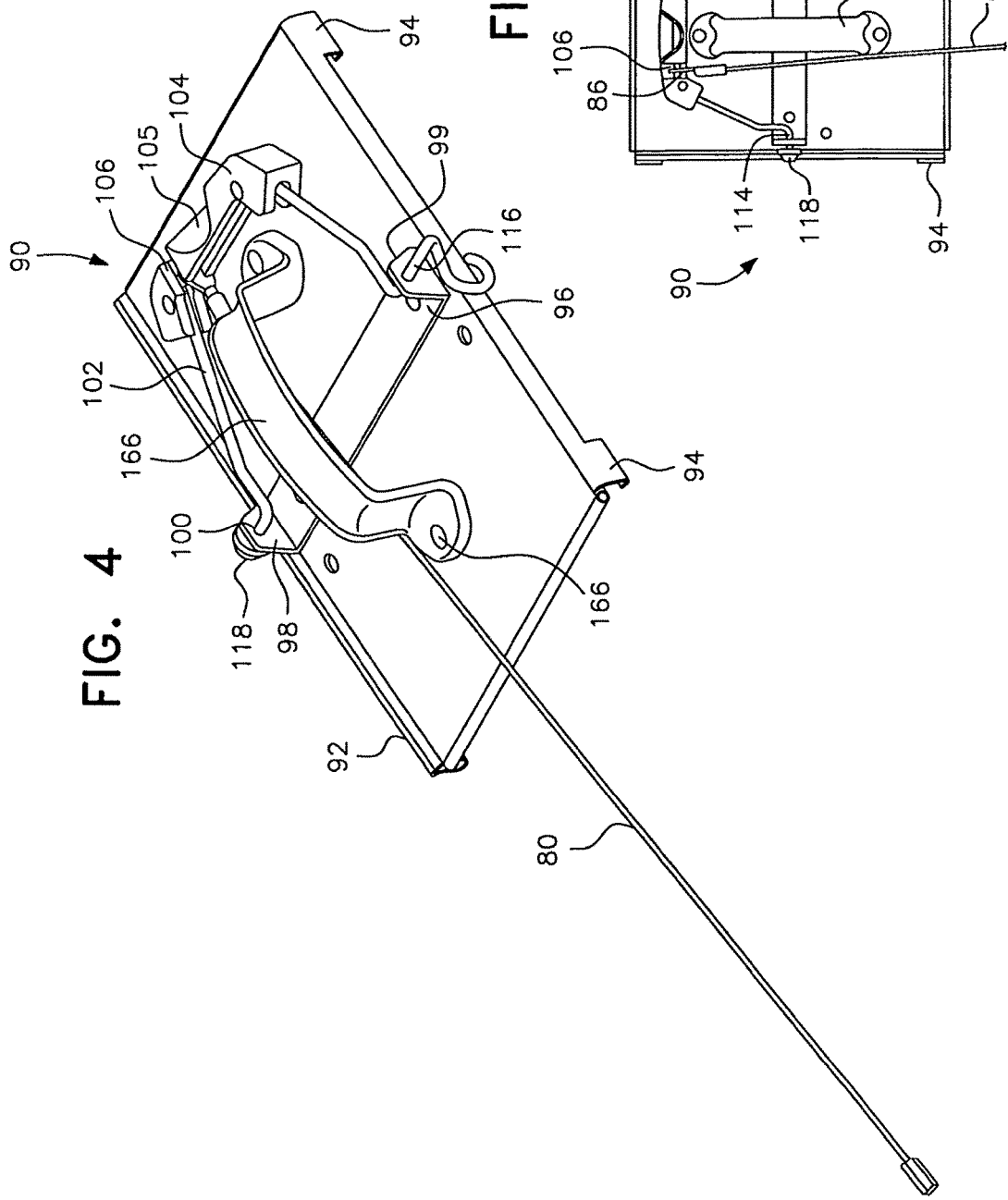

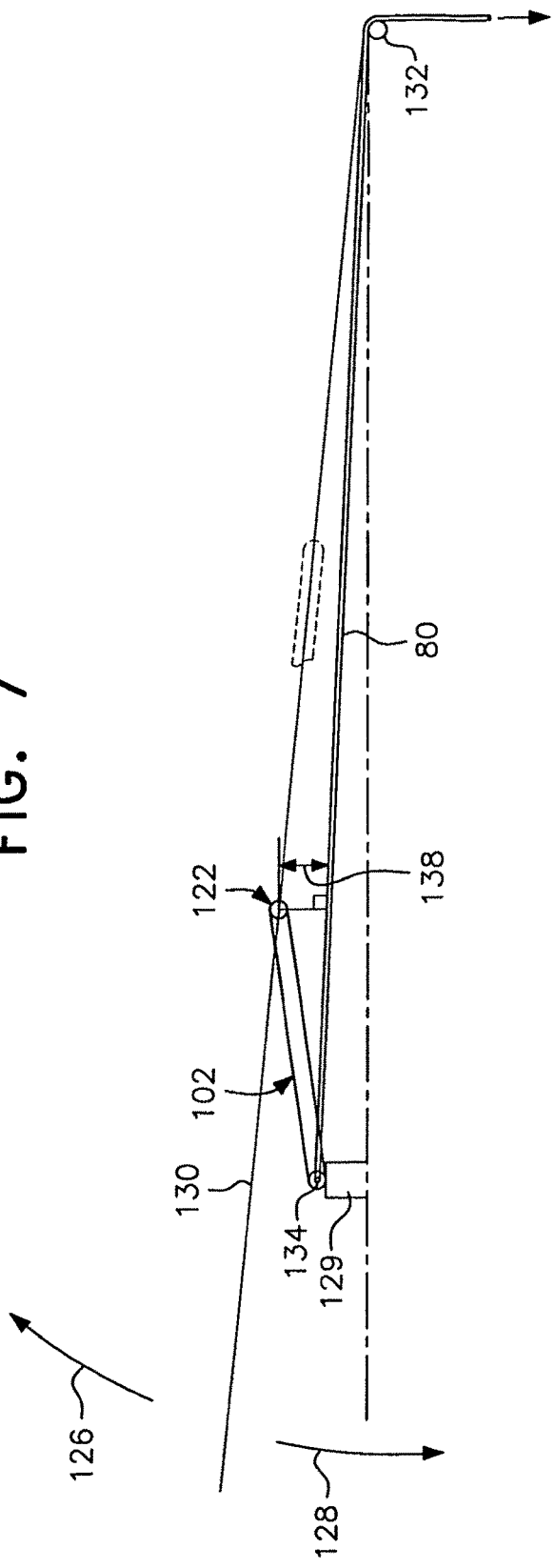

TWO-DOOR CAGE TRAP WITH OVER-CENTER SET MECHANISM

This application is a continuation application of copending U.S. Ser. No. 14/153,921 filed Jan. 13, 2014, issuing as U.S. Pat. No. 9,420,777 on Aug. 23, 2016, which was a continuation of U.S. Ser. No. 13/594,257 filed Aug. 24, 2012, issuing as U.S. Pat. No. 8,627,595 on Jan. 14, 2014, which was a continuation of U.S. Ser. No. 13/317,653 filed Oct. 25, 2011, now U.S. Pat. No. 8,250,802 on Aug. 28, 2012, which was a continuation application of U.S. Ser. No. 12/292,218 filed Nov. 13, 2008, issuing as U.S. Pat. No. 8,046,953 on Nov. 1, 2011, which was a continuation-in-part of U.S. Ser. No. 11/600,085 filed Nov. 16, 2006, issuing as U.S. Pat. No. 7,757,427 on Jul. 20, 2010, the priority of which is hereby claimed.

BACKGROUND OF THE INVENTION

1. Field of the Invention

This invention relates to cage-type animal traps of the kind generally used outdoors for trapping small to medium sized animals without harming the trapped animal. Such traps commonly comprise a cage of metal wire mesh or the like with a door held open by a trigger mechanism until an animal is lured into the trap by suitable pre-inserted bait. After the animal enters the interior of the trap, the animal's weight pressed against the trigger actuates a trip which releases and closes the door, thereby trapping the animal inside the cage.

2. Description of the Prior Art

Cage traps of the prior art have specific setting and releasing mechanisms which typically consist of a pan, a trigger rod, a latching device, a door, a locking device and sometimes a spring member. To set the trap, the locking device must be disengaged. A door is then opened and a latch is set. The location of each of these components on the trap requires the use of two hands. In order to release the trapped animal, once again the locking device must be disengaged, the door must be opened and the latch set. Again, these steps require the use of two hands and involve close contact with the animal. There is thus a need for a cage-type trap that provides the user with an easy, essentially one-handed method of setting the trap. There is also a need for a cage-type trap where the user can easily release a trapped animal without subjecting the user to close contact with the trapped animal.

Another problem with the prior art cage traps is the complexity and unreliability of the trigger or actuation mechanism used to initiate the door closure. With prior art designs having complicated setting structures, the force required to trip the trap can vary. This results in either a failure to capture the animal, if the required force is too great, or false trips due to a lack of stability in the set position. Complex trigger or actuation mechanisms also make it difficult to set the traps and increases the risk of malfunction. There is thus a need for a cage trap that provides trigger mechanism having a simple mechanical design which is easy to set, consistent in trip force, and reliable in use.

The foregoing problems also arise with two-door traps, creating a need for a two-door-opening trap that can be reliably and consistently set without close contact with the animal and while essentially requiring only one hand. A further advantageous capability for which there is a need is a two-door-opening trap that can be selectively used by the user in both one-door-opening and two-door-opening configurations.

It is to the solution of these and other problems that the present invention is directed.

SUMMARY OF THE INVENTION

The present invention is directed to one-door and two-door cage-type animal traps that include a wire mesh animal enclosure made up of a base, a pair of opposed sidewalls emanating from the base, a rear wall, secured to the sidewalls and the base, a roof secured to the tops of the sidewalls and the rear wall, and a front end provided with an animal access opening defined by the base, sidewalls, and roof.

In a single-door-opening embodiment of the trap, a door is movably mounted at the front end and operates in an opened position to reveal an animal access opening and in a closed position to block the animal access opening. A torsion spring operatively connected to a locking yoke urges the door toward its closed position. The door is held in its open position by an over-center-type set mechanism which is mounted on the roof and includes a cable assembly that extends to a point of connection on the door.

In addition to the cable assembly, the over-center set mechanism further includes a set mechanism platform attached to the roof with a transversely extending set lever bracket mounted thereon. A generally U-shaped set lever is pivotally coupled to both ends of the bracket so as to be movable through slightly more than 180 degrees from one side of the bracket in the set position to the other side of the bracket in the tripped position. Generally centered on the set lever is a lever grip that can be grasped by a user when setting the trap to facilitate placement of the set lever in the set position. The grip also ensures that the cable end opposite the door connection, which is attached to the set lever, is prevented from sliding left or right on the lever. The over-center set mechanism is coupled to a trip mechanism for initiating activation of trap closure.

The trip mechanism is in the form of a bait pedal movably mounted in the animal enclosure with a trip rod and link assembly secured to the pedal and to the over-center set mechanism. When an animal enters the animal enclosure, the weight of the animal moves the pedal which causes the trip rod and link assembly connected thereto to move and initiate rotation of the set lever. The connections between the trip rod and link assembly and the set lever are preferably metal-on-metal for repeatable frictional behavior. Once the set lever has pivoted from the set position beyond a point of equilibrium, i.e., over center, the weight of the door and the spring force of the torsion spring provided through the cable causes the set lever to rotate. This movement, in turn, moves the door from the opened position to the closed position, thereby trapping the animal in the animal enclosure.

A handle is mounted on the set mechanism platform in about the center of the trap and extends longitudinally with the length of the trap. In one preferred embodiment that allows the handle to be centered, the cable attachment point on the grip is offset relative to the center of the set lever so that the cable lies along one side of the handle.

According to a two-door-opening embodiment of the trap, the handle is further provided with a slot passing longitudinally through the handle mounting bases of the handle, which bases are attached to the set mechanism platform. A second cable assembly extends to a point of connection on the second door, passes through the slot and then is redirected 180 degrees, defining a curved portion, to connect to the set lever next to the connection point of the first cable. To open the second door along with the first door when setting the trap, the curved portion of the second cable is first looped over a cable guide mechanism mounted on the top of the trap between the set mechanism platform and the front edge of the trap adjacent the first door. The cable guide mechanism then acts as a pulley to assist in tensioning the second cable and raising the second door when the set lever is moved to the set position. At the same time, the first cable mechanism acts to raise the first door in the same manner as in the single-door-opening trap. The two-door-opening trap can selectively be operated as a one-door-opening trap by not engaging the second cable with the cable guide mechanism in which case only the first door is raised when the set lever is placed in the set position.

It is thus an object of the present invention to provide one-door and two-door cage traps demonstrating mechanical simplicity for ease of setting the trap and having reliable stability once set.

It is a further object of the present invention to provide cage traps having pivot points that demonstrate consistent frictional behavior to enable highly repeatable tripping of the trap at an essentially constant trigger force level.

It is another object of the present invention to provide cage traps which can be safely and easily set, and from which a trapped animal can be safely and easily released, by the user using only one hand.

It is yet another object of the present invention to provide cage traps having a simplified mechanism for safely and easily setting the trap from a stable centered position on the trap.

It is still another object of the present invention to provide cage traps having an improved mechanism for safely and easily releasing an animal from the trap from a stable centered position on the trap.

It is yet another objection of the present invention to provide a cage trap having two openable doors which can be set selectively to operate as either a one-door or a two-door trap.

Additional objects of the invention include, for example, the provision of one door and two-door cage traps which are durable, reliable and user friendly, which are animal friendly and which trap the animal safely in a humane manner, and which can be manufactured from readily available components and in a cost-effective manner.

BRIEF DESCRIPTION OF THE DRAWINGS

Other objects, features and advantages of the present invention will be apparent to those skilled in the art upon a reading of this specification including the accompanying drawings. While intending to illustrate the invention, the drawings are not necessarily to scale.

FIG. 1 is a perspective view of a one-door embodiment of the present inventive trap in a tripped position with the door of the trap closed.

FIG. 4 is a perspective view of the over-center set mechanism of the trap of FIG. 1.

FIG. 5 is a top view of the over-center set mechanism of FIG. 4.

FIG. 7 is a schematic side view of the over-center set mechanism used in setting the trap of FIG. 1.

DETAILED DESCRIPTION OF THE PREFERRED EMBODIMENTS

Figure 1A:
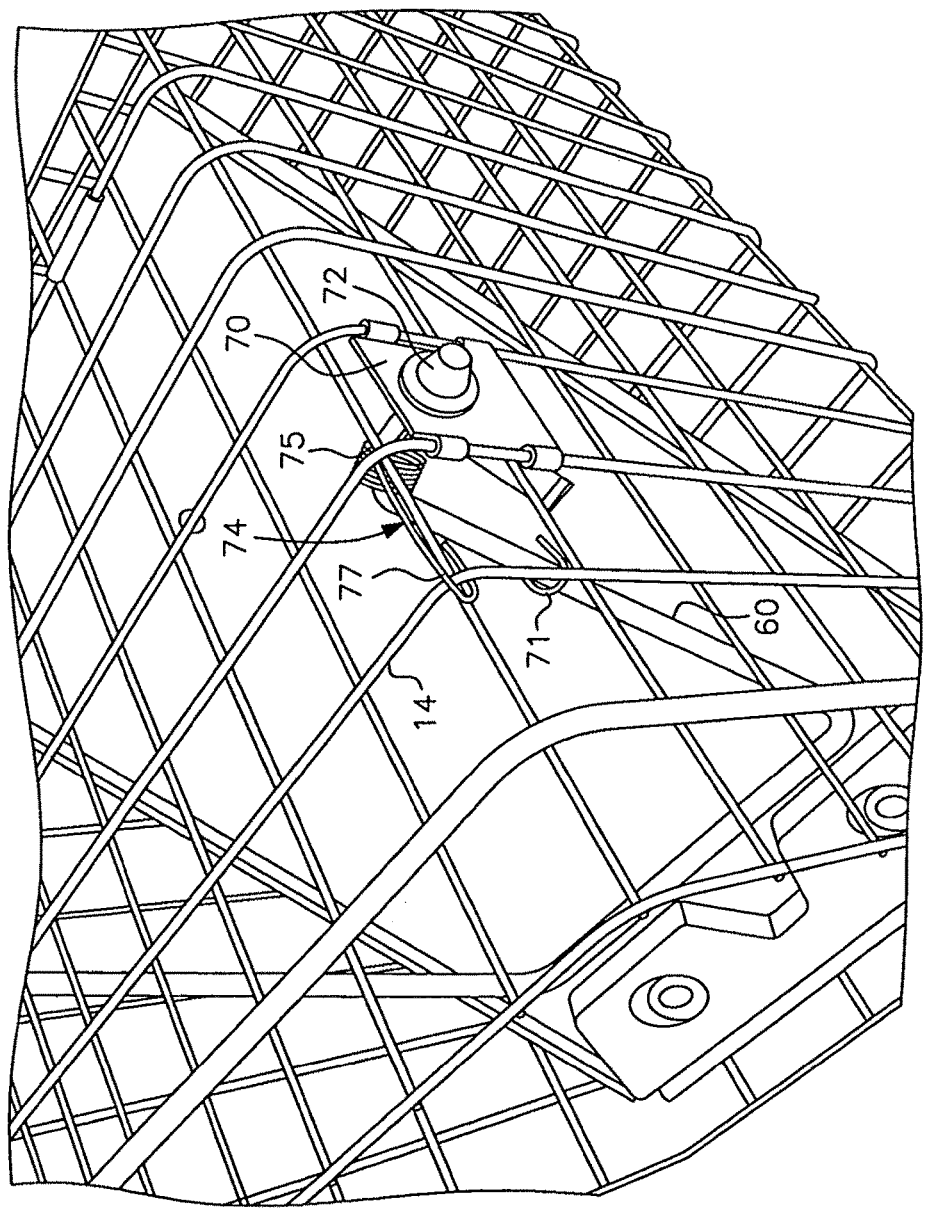
FIG. 1A is an enlarged view of area A of FIG. 1, depicting the torsion spring as installed to bias the locking yoke against the door.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

As shown in FIG. 1, a one-door cage trap of the present invention, generally designated by reference numeral 10, includes a box-like cage having an elongated base 12 and corresponding roof 14 and opposed sidewalls 16 and 18 preferably formed and folded from a single piece of wire mesh. The sidewalls extend between the longitudinal edges 20 and 22 of the base 12 and the longitudinal edges 24, 26 of the roof 14 to define planes that are essentially parallel to each other. The base and roof are also essentially parallel with one another. The rear of the trap is closed by a rear wall 28 which is secured to the base 12, roof 14 and sidewalls 16, 18 by attachment elements 30.

In the embodiment of the invention as shown in FIG. 1, the base 12, roof 14 and side walls 16, 18 include wire elements welded at their crossing points to form generally rectangular apertures 36, with the side walls bent up and down at substantially right angles from the base and roof, respectively. The rectangular apertures 36 are approximately 1" square.

Figure 12:
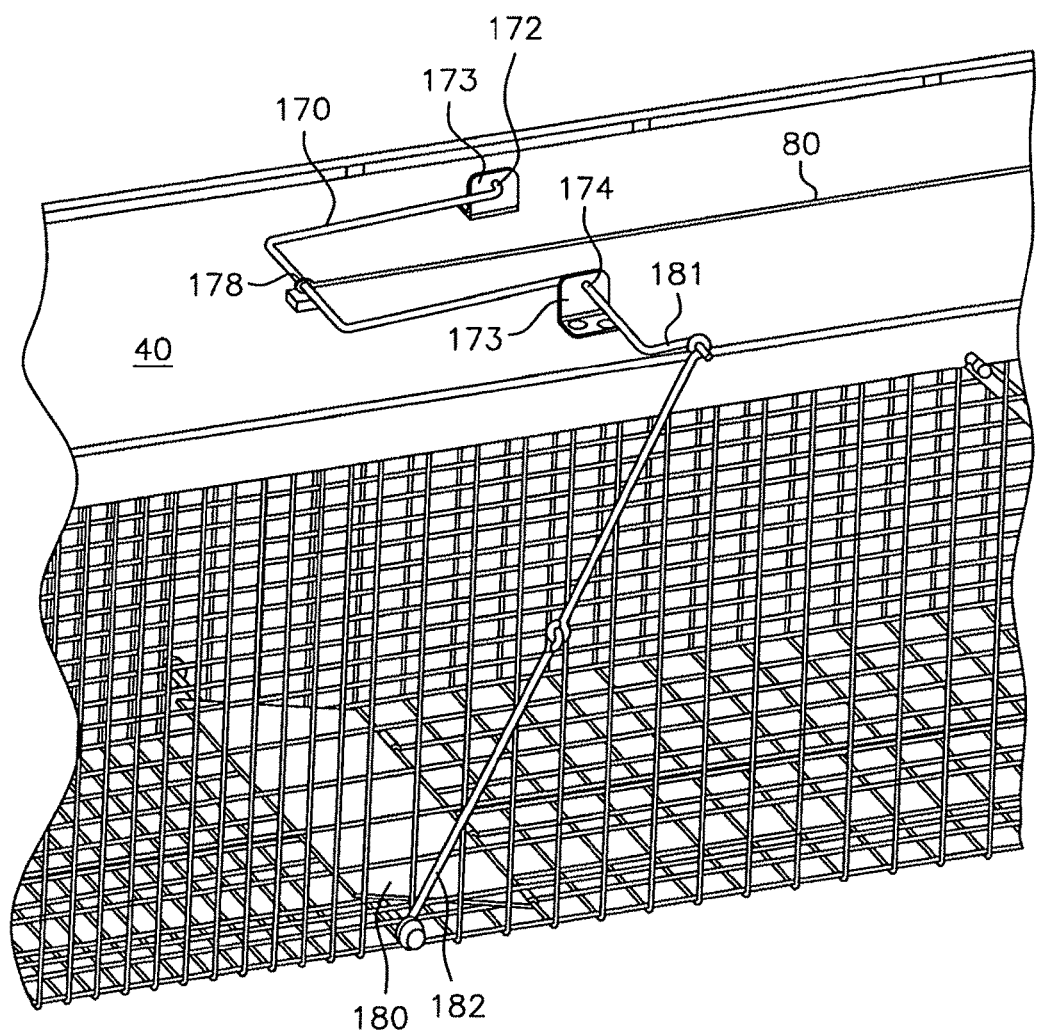
FIG. 12 is a perspective view of a second embodiment of an over-center set mechanism in accordance with the present invention.
Figure 13:
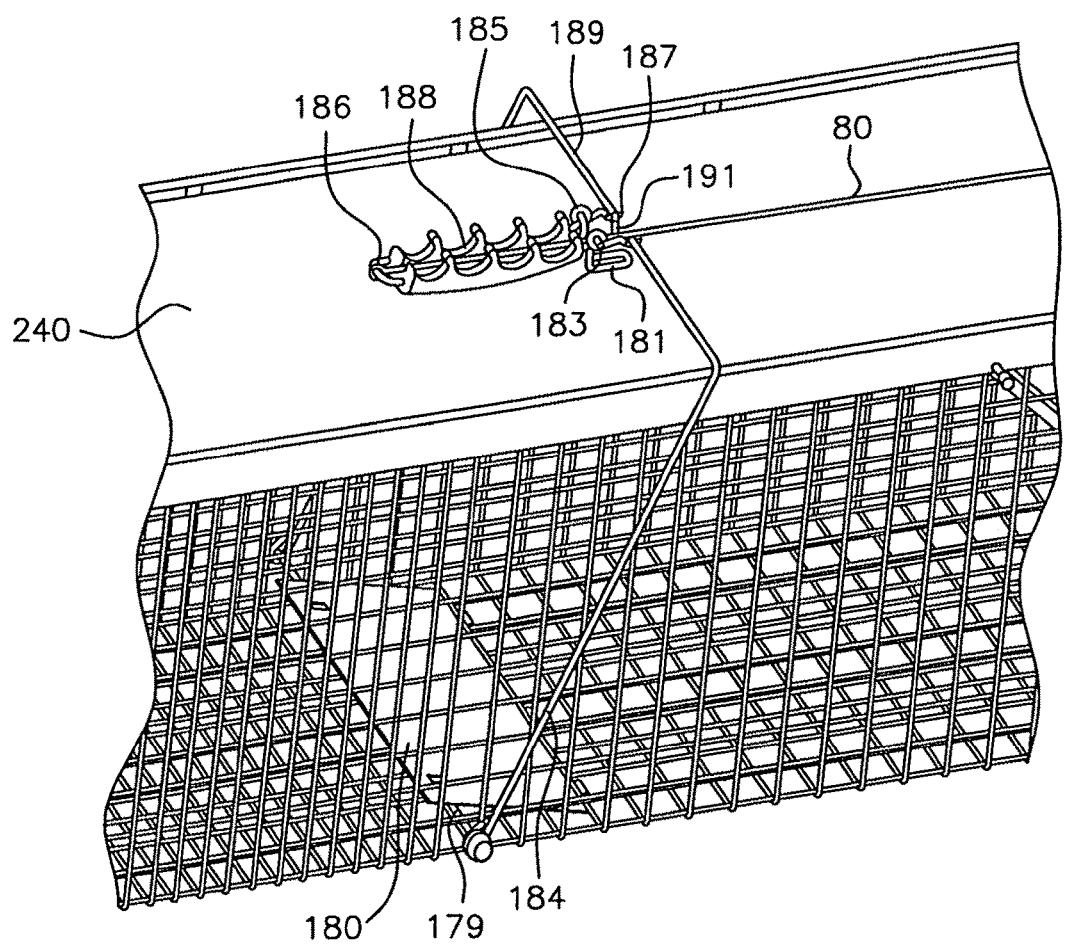
FIG. 13 is a perspective view of a third embodiment of an over-center set mechanism in accordance with the present invention.
Figure 14:
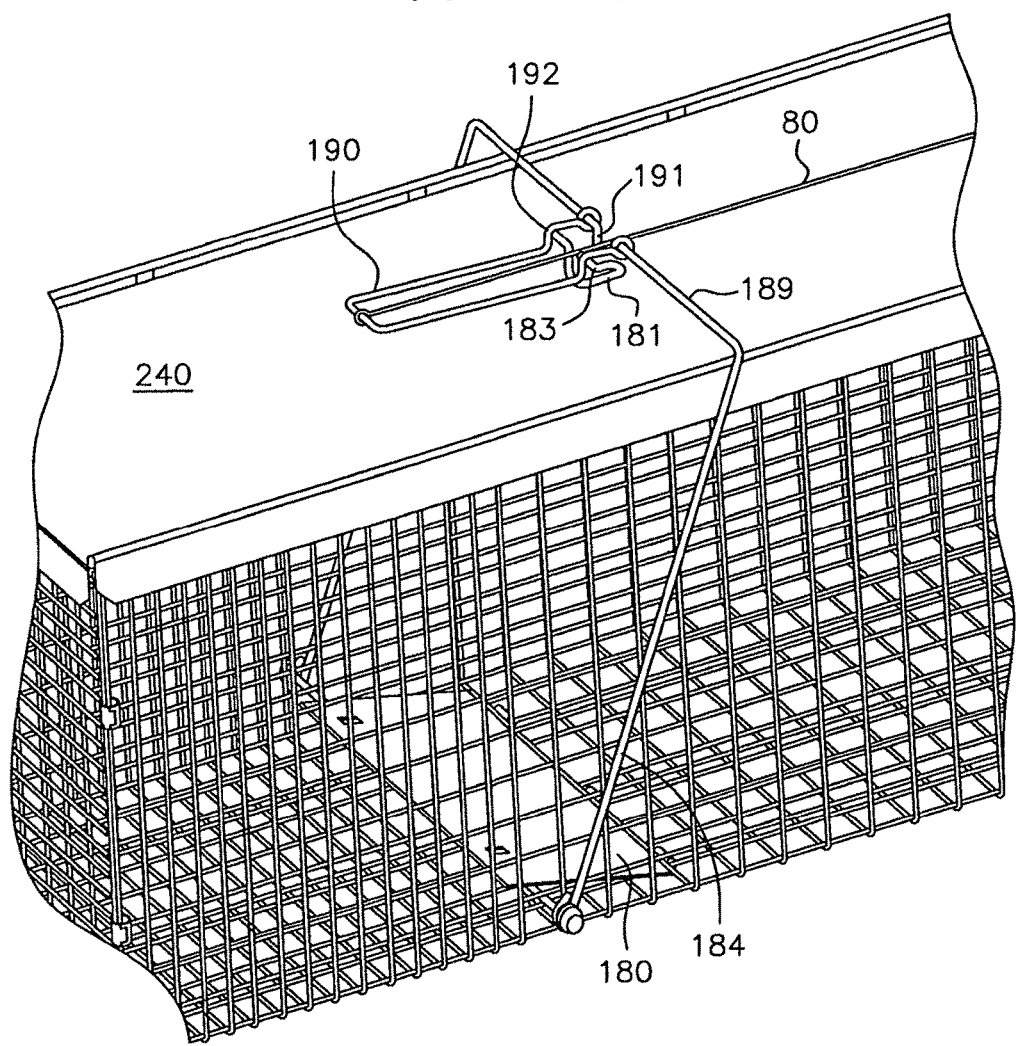
FIG. 14 is a perspective view of a fourth embodiment of an over-center set mechanism in accordance with the present invention.

Alternatively, the cage structure can include a base and two upwardly extending sidewalls to which are mounted an elongated cover or roof 40 which may preferably be stamped from sheet metal (see FIGS. 12-14). The rectangular roof generally consists of a piece of sheet metal formed to provide edges that bend over the corresponding wire of the trap body. Cage traps of this type are known, as representatively set forth in copending application, U.S. Ser. No. 11/097,195 (also assigned to the assignee of this application), which is hereby incorporated by reference herein as if set forth in its entirety.

In order to hold an animal within the enclosure, a trap door mechanism, generally designated by reference numeral 44, is provided that includes en elongated door 46 preferably made of sheet metal. The upper portion of the door 46 is pivotally connected to the roof by bent tabs 48. The end of the trap on which the door is mounted is herein referred to as the forward end, while the end adjacent the rear wall is the rearward end.

A door lock plate 50 is positioned horizontally and secured along the lower edge 52 of the door panel. Alternatively, the lock plate 50 could be an integral component of the door 46 if stamped or otherwise formed in the door. A U-shaped locking wire yoke 60 has a lower portion 62 which wedges up against, the corner created by the upper edge 64 of the door lock plate 50 and the outer surface 54 of the door when the door is in the closed position, as shown in FIG. 1. The ends 66 and 68 of the yoke are rotatably coupled to the sidewalls 16, 18 through door pivot plates 70 and retained by retaining elements 72.

Figure 2:
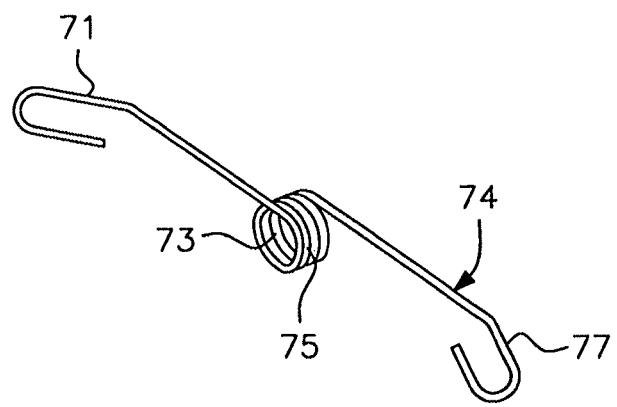
FIG. 2 is a perspective view of a torsion spring used to bias the door of the trap of FIG. 1 toward its closed position.

A torsion wire spring 74, shown installed in the enlarged view of FIG. 1A and alone in FIG. 2, is provided to bias the yoke 60 in a downward direction toward the door. One end of the yoke 60 is inserted into the center opening 73 of the torsion spring coil 75, with one arm 71 of the torsion spring engaging the yoke 60 and the other arm 77 of the torsion spring deflected and engaging the roof 14. In this configuration the spring 74 forces the yoke against the door.

Figure 3:
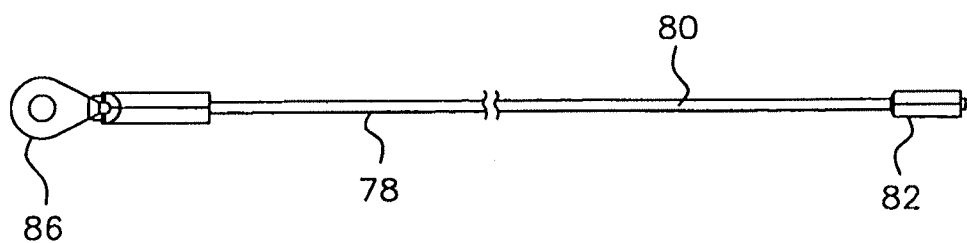
FIG. 3 is a perspective view of the cable assembly connected between the set mechanism and the door in the trap of FIG. 1.

The bottom portion 76 of the door lock plate 50 contains a hole (not shown) which receives one end of a cable assembly, generally designated by the reference numeral 78, as shown in FIG. 3. The cable assembly 78 includes a cable 80 that passes through the hole of plate 50 and is prevented from pulling back out by a plug 82 secured to the door-connecting end of the cable. From the plug 82, the cable 80 passes beneath the lower portion 62 of the yoke 60 and over the outer surface 54 of the door 46 in an upward direction to pass over the top of support wire 84 and above the roof 14. The end of the cable opposite the door-connecting end has an eyelet 86 coupled thereto for attachment to the set lever as hereafter described.

An over-center set mechanism, generally designated by reference numeral 90 and shown in detail in FIGS. 4 and 5, is mounted on top of the roof 14 and includes a set mechanism platform 92 secured to the longitudinal edges 24, 26 of the roof 14 by flange tabs 94 that are bent to encircle corresponding portions of the wire mesh. A transversely extending set lever bracket 96 is mounted on the platform 92. The bracket 96 includes two upwardly extending arms 98, 99 adjacent the ends of the bracket, respectively, with each arm 98, 99 having a substantially circular hole 100 therethrough.

Figure 6:
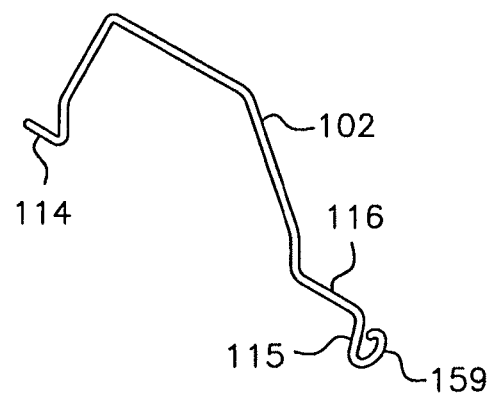
FIG. 6 is a perspective view of the set lever used in the over-center set mechanism of FIGS. 4 and 5.

A generally U-shaped set lever 102 is pivotally coupled at each end to the arms 98, 99 of the bracket 96 so as to be movable through slightly more than 180 degrees, from a rearward position on one side of the bracket to a forward position on the other side of the bracket. A preferred embodiment of the set lever is shown in FIG. 6. As will be discussed hereinafter, the trap may be operatively designed with the set lever moving less than 180 degrees such that movement of the lever from one side of the bracket to the other is not necessary.

Specifically, other configurations in which the set lever is movable through a lesser or greater range of motion may be constructed, as would be understood by persons of ordinary skill in the art. In sum, the amount of angular movement required depends on the cable travel needed to open the door from the closed position and the radial distance between the set lever axis and the point where the cable attaches to the set lever. More particularly, the required angle through which the set lever must travel is the difference between the set position, in which the door is open, and the point in the travel of the set lever at which the door is closed such that the cable is no longer under tension. Travel beyond this angle does not result in further door movement but merely increases the degree of slack in the cable. Some degree of slack may be beneficial from a practical standpoint as it increases the manufacturing tolerances, thus reducing the dimensional precision required for the components. A cable length that is about one inch longer than the minimum required length is preferred. Longer cables can, of course, be used with the understanding that there will be a greater degree of cable slack in the door-closed position.

In practical terms, the disclosed configuration in which the set lever travels through approximately 180 degrees is optimal, since this geometry allows for the smallest set lever radius, i.e., the smallest radial distance between the set lever axis and the cable attachment point on the set lever. The disclosed set lever configuration also allows for the lowest trap profile since the set lever can rest nearly flat against the roof in the tripped condition. This angular movement of the set lever does not, however, require that cable be tensioned through a corresponding distance. Instead, the "active" range of cable travel in which the cable is tensioned and actually controlling door movement can be much smaller than the total travel of the set lever.

Manual movement of the set lever 102 is facilitated by a set lever grip 104 that is mounted on the lever. The grip 101 has a central channel 105 for receiving the yoke portion of the U-shaped lever 102 and an inset channel 106 for accommodating the eyelet 86 coupled to the lever attachment end of the cable 80. The cable assembly is attached to the lever by passing the lever through the eyelet 86. The grip is then mounted on the lever and secured in place by screws or the like. The cable 80 is thus prevented from sliding along the lever through containment thereof within the channel 106 in the grip 104. The cable assembly is tensioned by the spring-to-close bias of the door as provided by the torsion spring 74, as well as the weight of the door when the door is open.

The lever 102 includes first and second straight leg portions 114 and 116 at respective ends thereof that extend outwardly and have a generally cylindrical shape for passing through the holes 100 in the arms 98, 99 of the bracket 96. The first straight leg portion 114 is prevented from disengaging axially from its respective arm by a retaining element 118. The second straight leg portion 116 includes a crank arm portion 115 and is pivotally connected to a trip mechanism, generally designated by reference numeral 120, for initiating activation of trap closure.

The lever 102 has an "over-center" action during setting and tripping that enables the over-center set mechanism 90 to operate reliably and repeatably. As illustrated in FIG. 7, the pivot axis 122 of the set lever 102, along with the tension vector of the cable 80, defines a region of free travel 126 and a roughly symmetric region 128 where travel is limited by a stop 129. The line separating these two regions, where the cable force passes through the pivot axis, represents the plane of equilibrium 130.

Figure 8:
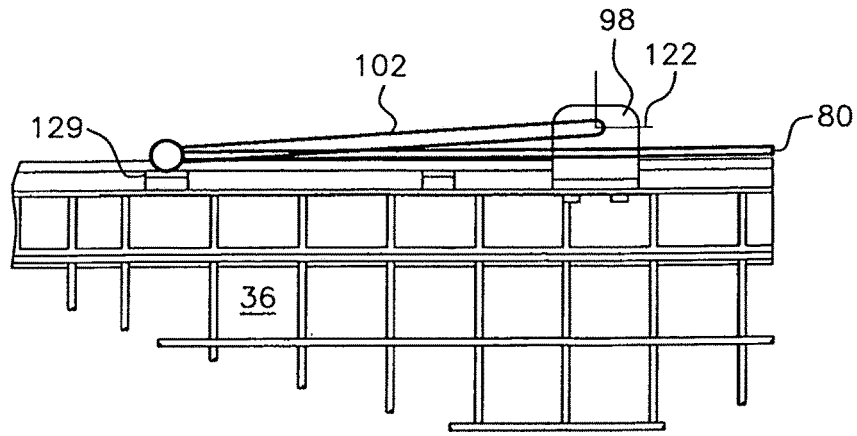
FIG. 8 is a side view showing the set condition of the over-center set mechanism of FIG. 7.

The cable force direction or vector is defined by two points: the cable fulcrum 132 near the front of the trap above the door, and cable connection point 134 where the cable attaches to the set lever 102. Since the location of the cable fulcrum 132 near the door does not change, the cable force direction varies only with the angle of the set lever. If the cable connection point 134 is in the region of free travel 126, the lever is free to move and the cable force causes the lever to rotate, allowing the door to close. If the cable connection 134 is in the region of limited travel 128, the cable force also causes the set lever to rotate, but in the opposite direction, and only until it encounters the stop 129. The result is that, as the set lever 102 is pulled from the "door closed" position through the region of free travel, the cable force bias is directed to close the trap. As the movement of the set lever continues and passes the balance or equilibrium point, i.e., the "over-center" plane, the force bias of cable 80 is directed to pull the set lever against the stop 129 and hold the trap in the open or set state, as shown in FIGS. 7 and 8. In this set state, the axis of the cable 80 lies below the lever pivot axis 122 and the trap is stable so as not to trip the set mechanism 90 should it be lightly jarred. According to a preferred embodiment, the stop is incorporated into the set lever grip 104, which comes into direct contact with the surface of the platform 92 to establish the open-state bias without a separate stop 129 on the platform.

Figure 9:
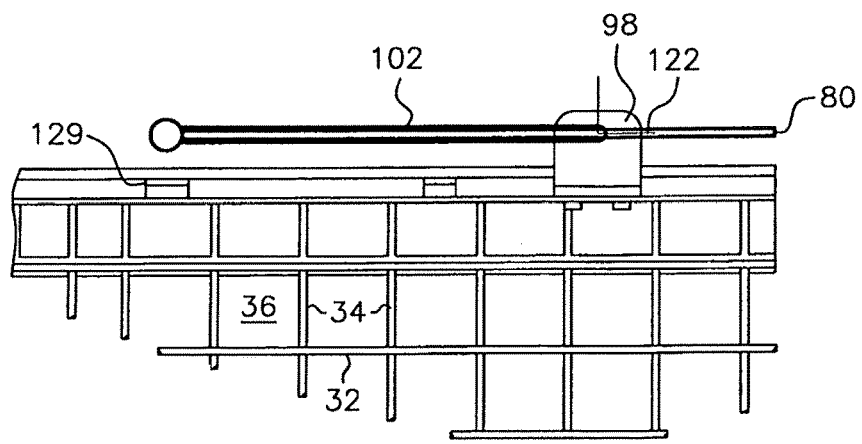
FIG. 9 is a side view showing the balanced condition of the over-center set mechanism of FIG. 7.
Figure 10:
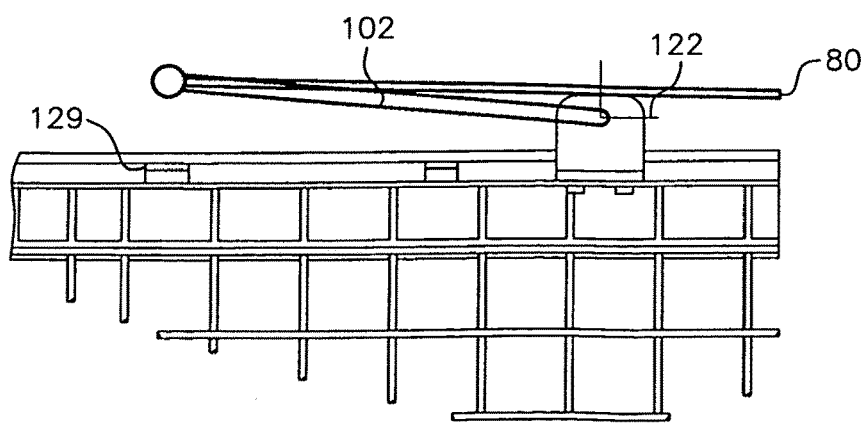
FIG. 10 is a side view showing the tripped condition of the over-center set mechanism of FIG. 7.

Upon activation of the over-center set mechanism 90, the lever 102 moves upwardly in the limited travel region 128, away from the stop 129. When the cable axis passes through the lever pivot axis 122, the over-center point or plane of equilibrium 130 is reached and the set mechanism is in a balanced condition, as shown in FIG. 9. As the set lever continues to move, the set mechanism enters the trip condition in which the set lever is free to travel. In this free travel region 126, the cable axis lies above the lever pivot axis 122, as shown in FIG. 10.

The magnitude of the open-state bias is determined by the open state bias offset 138 which is the minimum distance, measured perpendicular as shown in FIG. 7, between the pivot axis 122 and the force vector of the cable 80 when the set lever is against the stop. As noted earlier, the force vector of the cable is defined by the cable fulcrum 132 near the door and the point 134 where the cable attaches to the set lever.

The open-state bias offset 138 serves two functions. First, it provides a stable set condition by resisting self-firing and, second, it establishes the torque required to trip the set mechanism. Thus, the trip force or tripping torque can be adjusted by adjusting the stop position, with the tripping torque being equal to the product of the cable force and the open state bias offset. A stop position that sets the cable force vector closer to the pivot axis 122 results in a lower required trip force while a stop position that sets the cable force vector farther from the pivot axis results in a higher required trip force. In the same way, the tripping torque can also be adjusted by raising or lowering the pivot axis as this will also increase or decrease the open state bias offset, respectively.

Tripping the set mechanism 90 is accomplished by providing sufficient torque to the set lever 102 to overcome the tripping torque. According to the present invention, because the open-bias torque decreases as the mechanism is tripped, mechanism becomes easier to trip as it is moved in the direction of tripping. This aids the transition between the set and tripped conditions.

Figure 11:
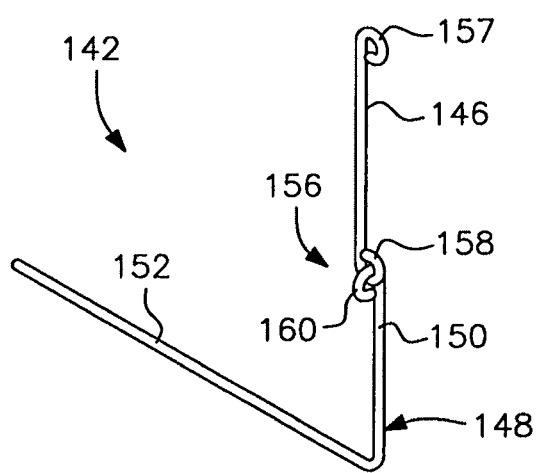
FIG. 11 is a perspective view illustrating the trip rod and link assembly used in the trap of FIG. 1.

Turning to FIG. 11, the trip mechanism 120 includes a trip rod and link assembly, generally designated by reference numeral 142, movably coupled to a bait pedal 144 that is movably mounted to the base 12 so as to be within the animal enclosure area. The trip rod and link assembly 142 has a link element 146 movably coupled with a trip rod, generally designated by reference numeral 148. The trip rod 148 has a generally L-shaped configuration with a first elongated member 150 generally aligned with the link element 146 and a second arm 152 extending in a generally horizontal direction and engaging with the upper portion 154 of the pedal 144. If desired, the free end of the second arm may be retained within the sidewall 18 by a suitable retainer 153.

The joint, generally designated by reference numeral 156, between the link element 146 and trip rod 148 is shown as being formed between linked loop portions 158, 160 of the two members. Similarly the joint between the link element 146 and the lever arm 116 is effected by linked loop portions 157, 159 of the two members. Other joint constructions could also be used, so long as they provide sufficient freedom of movement between the trip rod and link, and between the link element and the lever arm, to effect the over-center action of the set lever 102 and the collapsible linkage as shown in FIG. 1.

The bait pedal 144 serves as the force input location for the over-center set mechanism 90. The bottom edge 162 of the pedal 144 is rotatably secured to the bottom of the cage by bent crimps 164 which are evenly spaced along the bottom edge 162 and bent around one of the wires of the wire mesh. The upper portion 154 of the pedal 144 is affixed to the trip rod.

When an animal enters the animal enclosure, the weight of the animal applies downward pressure on the upper portion 154 of the bait pedal 144, causing the pedal to pivot along its bottom edge 162. This movement causes the trip rod and link assembly 142 to pull down upon the linked looped portion 159 of the set lever 102 a sufficient distance and with sufficient force to initiate rotation of the set lever. Once the set lever has rotated beyond the plane of equilibrium 130, the set lever reaches the region of free travel 126 as tension force transmitted by the cable, under the action of the torsion spring 74 and the weight of the door 46, moves the set lever 102 from the rearward side of the set lever bracket 96 to the forward side thereof. This movement allows the door 46 to move from the opened position to the closed position, thereby trapping the animal in the animal enclosure.

A handle 166 is preferably mounted on the set mechanism platform 92 in about the center of the trap and extends longitudinally with the length thereof. The channel 106 within the grip 104 is offset relative to the center of the set lever 102 so that the cable 80 lies along one side of the handle 166.

In order to set the trap 10 from its door c used condition, the trap is first placed on the ground or a supporting surface. By grasping the hand grip 104 and lifting it from the roof 14, the set lever 102 can be pivoted from its forward position rearwardly until it passes the point of equilibrium at which point the grip, in response to the force exerted by the torsion spring 74 through the cable bias, will move easily to come into abutment with the upper surface of the platform 92 in the lever's rearward position or stop 129, as desired. Rearward movement of the lever results in the cable 80 being pulled in a rearward direction to rotate the door 46 on the tabs 48 in an upward direction and set the door in a loaded position. Having accomplished this action with one hand, the trap is now set, awaiting the entrance of an animal to activate the trap.

To entice an animal, into the trap, a suitable bait is inserted into the interior of the trap behind the pedal 144. When the animal enters the trap and steps on the pedal 144, the pedal is rotated in a downward direction which causes the trip rod and link assembly 142 to pull the trip rod in a downward direction. This pulls downwardly on the extended arm 116, crank arm 115 and loop 159 of the set lever 102 which, given the shape of the lever, causes the lever to rotate and the U-shaped portion to lift upwardly. Once the plane of equilibrium is passed, the torsion spring and the weight of the door 46 cause the door to rotate in a downward direction to rapidly close the interior space 70 and trap the animal within the case 10.

During downward rotation of the door 46, the downwardly biased yoke 60, through the urging of torsion spring 74, presses up against the upper surface 54 of the door 46 and becomes lodged in the corner created by the upper edge 64 of the door lock plate 50 and the outer surface 54 of the door 45 when the door is in the closed position. Under these conditions, if the animal tries to open the door, the lower portion 52 of the yoke will press against the door lock plate 50 preventing the animal from rotating the door in an upward direction.

When the user desires to release a trapped animal, the user follows a procedure similar to setting the trap. Initial rearward movement of the grip 104 tensions the actuating cable 80 which, because the cable passes underneath the lower portion 62 of the locking yoke 60, causes the yoke 60 to be lifted in an upward direction disengaging from the top edge of the door lock plate by the urging of the cable 80. Accordingly, a trapped animal can be released by a person located at the rear of the trap by lifting the hand grip 104 from the roof past the point of equilibrium and allowing the set lever 102 to move to its rearward position.

As used herein, the term "trip rod and link assembly" is intended to have its broadest meaning and can include cable or other trigger mechanisms to pull the set lever 102 when the pedal 144 is rotated to its downward position. In addition, those skilled in the art can appreciate that the trigger rod could be formed with the link as one piece, such as by molding. The bait pedal could also be integral with the rod. Other trip mechanisms with which the animal interacts, as by pulling, could be substituted for pedal 144 and be formed as part of the trigger rod.

A second embodiment of a trap with an over-center set mechanism in accordance with the present invention is illustrated in FIG. 12, with the set lever 170 shown in the "set" condition. The pivot axis is defined by the two points 172, 174, in upstanding brackets 173 fixed onto the roof 40, while the tensed cable 80 pulls on the set lever 170 at the point 178. The set lever 170 is essentially planar and is coupled to the bait pedal 180 with a jointed collapsible linkage 182. When the bait pedal is rotated downwardly, the linkage pulls down on crank arm 181 to rotate set lever 170 past over-center to thus close the trap door in the manner previously described. The trap is set in the same manner.

A third embodiment of the over-center set mechanism of the present invention is illustrated in FIG. 13. As shown, this embodiment employs a modified unitary trip rod 184 and a compact set lever 186 with a longitudinally extending grip 188 fitted thereon. The set lever 186 is provided with integrally formed loops 185 and hooks 187. The loops 185 receive the ends 183 of a wire mount 181 affixed onto a sheet metal roof 240. The ends 183 are rotatably movable within the loops 185 and provide the rotation axis for the set lever 186.

The set lever 186 and trip rod 184 engage when the trap is set, and disengage when the trap is tripped. The trip rod 184 has an upper portion 189 with a centrally located dip 191 that is positioned between the hooks 187 when the set lever is in the set position, as shown in FIG. 13. When the door is closed (the trap is tripped), the dip 191 of the trip rod 184 rests on the roof 240 under the weight of the trip rod and that of the attached bait pedal 180 and pedal rod 179. In such condition, the set lever 186 is not in contact with the trip rod 184 and the hooks are in a position behind the trip rod 184 and facing rearwardly. The dip 191 holds the upper portion 189 of the trip rod 184 off the roof 240 so that the upper portion can be caught by the hooks to set the trap.

As the set lever 186 is lifted from the door closed position to set the trap, the hooks 187, which are offset from the rotation axis defined by the ends 183, rotate from their position behind the trip rod, through a path where they contact the upper portion 189 of the trip rod on either side of the dip 191 and lift the trip rod 184 into the set position above the roof 240. In the set position, the trip rod supports the bait pedal 180 above the floor of the trap. When force is applied to the bait pedal 180, the trip rod pulls downwardly on the hooks 187, supplying torque to the set lever 186 via the offset of the hooks from the rotation axis, to overcome the open-state bias and trip the trap. The distance between the loops and the roof is greater than the length of the hooks so that the hooks clear the roof as the set lever rotates. As the set lever continues through its motion, the hooks disengage with the trip rod, allowing the dip of the trip rod, to return to rest against the roof.

In a fourth embodiment shown in FIG. 14, the modified unitary trip rod 184 and wire mount 181 of the FIG. 13 embodiment are used with a set lever 190 that is attached directly to the trip rod such that the set lever and trip rod are always engaged. However, engagement of the "knee" portion 192 of the set lever with the ends 183 of the wire mount 181 only occurs when the trap is set. Specifically, from the tripped position in which the door is closed, the set lever 190 is pulled rearwardly so that the knee portion 192 engages the ends 183 of the wire mount 181. Once engaged thereon, the set lever is rotated into the over-center set position as in the other embodiments and shown in FIG. 14.

A two-door-opening embodiment of the trap according to the present invention, generally designated by reference numeral 200, shown in FIGS. 15A-18. According to the two-door-opening embodiment, a second door 246 is provided opposite the first door 46 so that both ends of the trap can be opened. Advantageously, the same trap can be operated as a one-door-opening trap, providing the user with a two-in-one design that provides the respective advantages and functionality of both one-door and two-door traps in a single unit.

Figure 17:
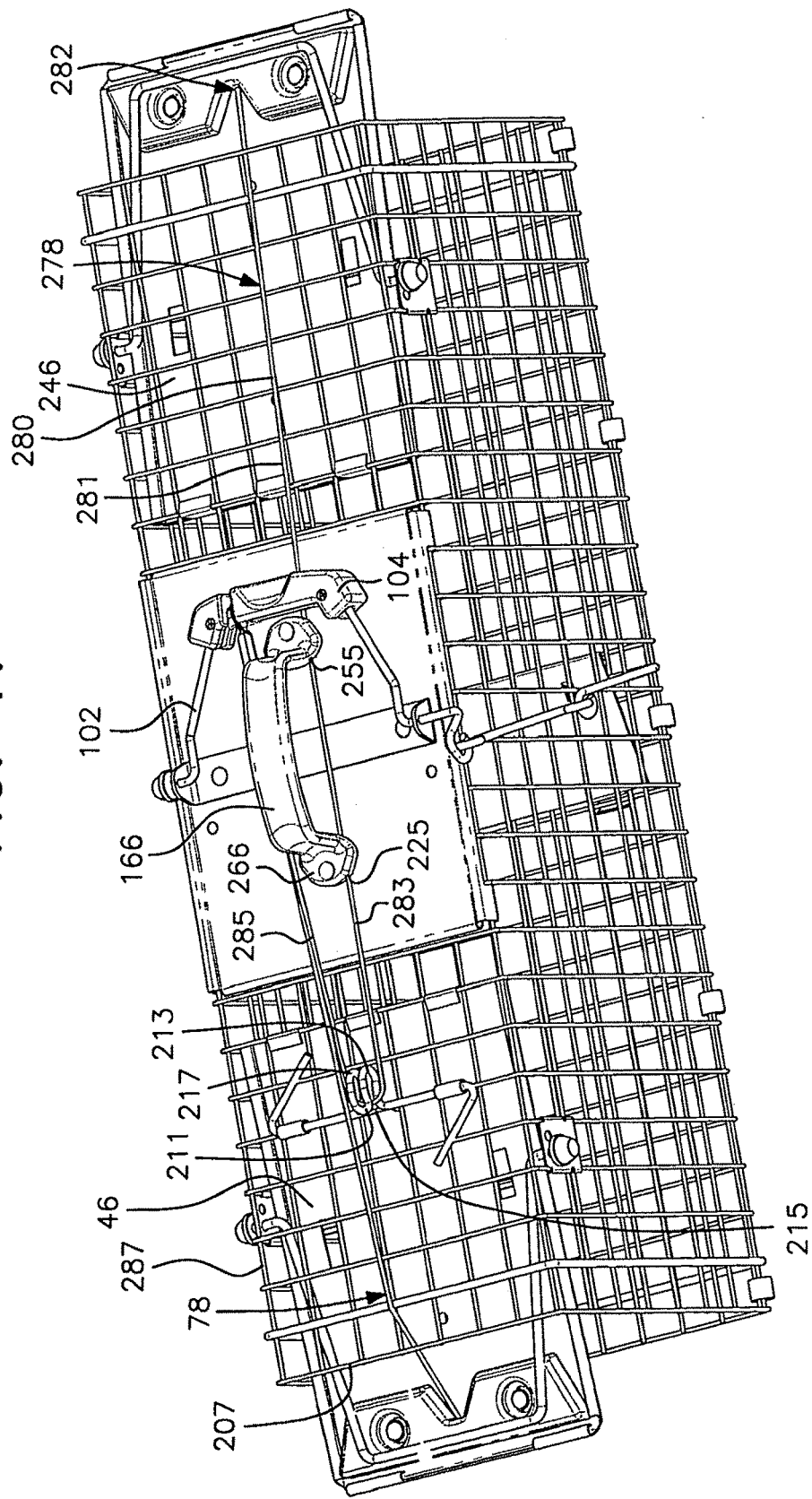
FIG. 17 is a perspective view of the trap of FIG. 16 in the set condition.
Figure 18:
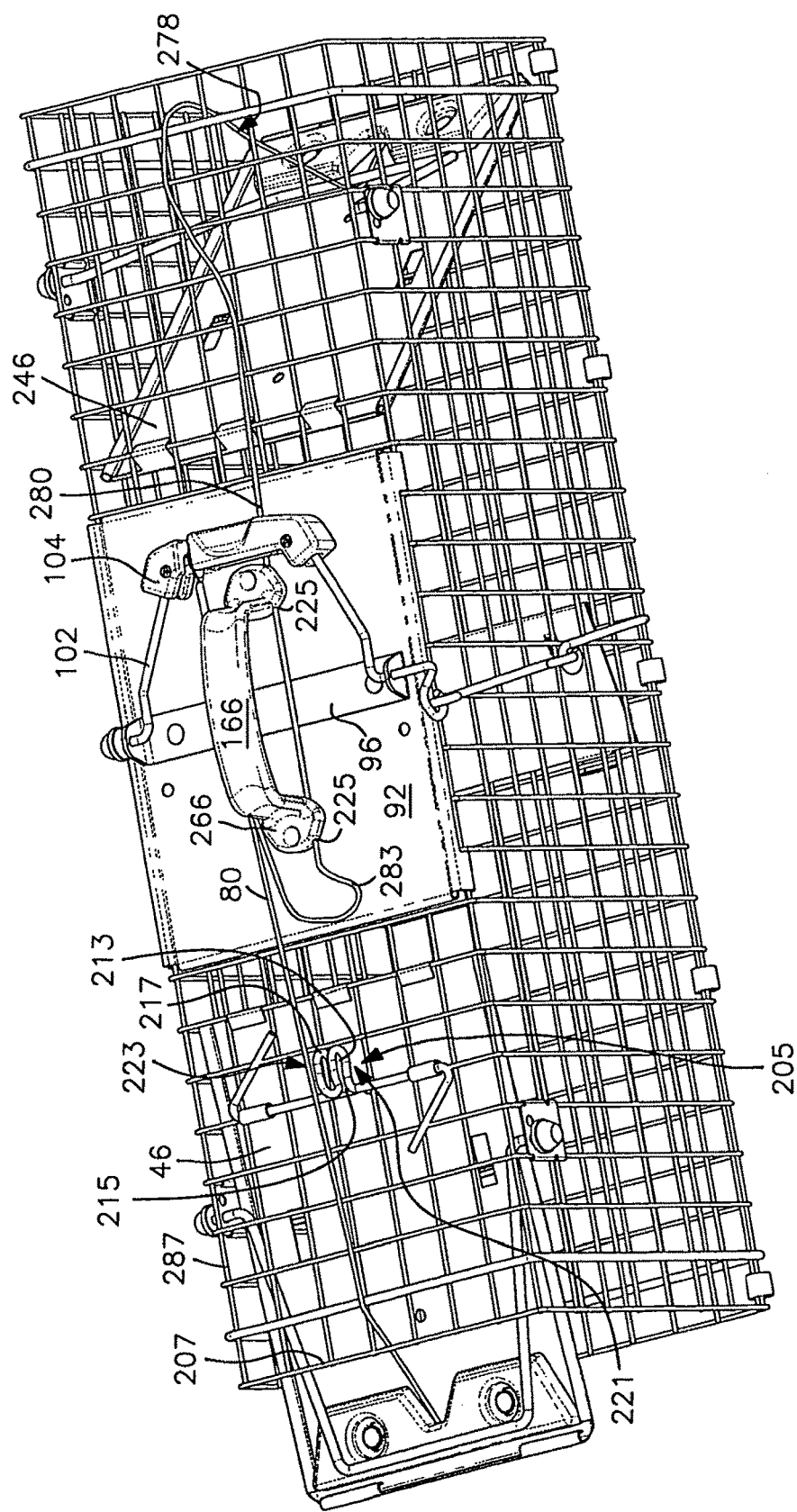
FIG. 18 is a perspective view of the trap of FIG. 15 in the set condition of the one-door-opening configuration.

To control movement of the second door 246, a second cable assembly generally designated by reference numeral 278, having a second cable 280 is secured between the set lever 102 and a point of attachment, generally designated by reference numeral 282, on the second door (see FIG. 17). To allow the single movement of the set lever from one side of the bracket 96 to the other side to activate both cable assemblies 78, 278, a cable guide mechanism, generally designated by reference numeral 205, is mounted on the top of the trap between the set platform 92 and the front top edge 207 of the trap. The cable guide mechanism 205 alters the direction of the second cable 280, turning it 180 degrees back upon itself so that, conceptually, the second cable has identifiable "portions". A door portion 281 of the second cable extends from the second door 246, past the set lever 102, to the cable guide mechanism 205. At the guide mechanism 205 the second cable 280 bends 180 degrees to define a curved U-turn portion 283 which then extends into a set lever portion 285 of the second cable (see FIG. 17). The set lever portion 285 of the second cable runs generally parallel with the door portion 281 thereof and ends at the attachment point within the grip 104 on the set lever 102. These "portions" of the second cable are identified herein for explanation purposes and do not represent particular lengths within the cable itself. Rather, the "portions" shift along the cable depending upon whether the trap is set or tripped.

According to a preferred embodiment shown in FIGS. 15A-18, the cable guide mechanism 205 is embodied as a wire-form hook 211. Other mechanisms may also be used to effect the 180 degree U-turn such as pulleys, guide tubes, spools, a cam, etc., as would be understood by persons of ordinary skill in the art.

The wire-form hook 211 forms a channel 213 having an opening 215 facing the front edge 207 of the trap, and away from the second door 246, and a closed face 217 nearest the set lever 102. The second cable 280 is received within the channel 213, passing from an entry side thereof, generally designated by reference numeral 221, to an exit side generally designated by reference numeral 223. When the trap is set, the second cable is tensioned against the closed face 217.

Proper cable positioning is preferably augmented by the inclusion of a cable management component on the roof of the trap. According to the preferred embodiment shown, the cable management component is embodied as slots 225 respectively formed in the mounting bases 266 of the handle 166. The slots 225 extend longitudinally through each of the mounting bases 266 and are in substantially linear alignment with one another, with the point 282 at which the second cable 280 attaches to the second door 246, and with the entry side 221 of the cable guide mechanism 205. By this linear alignment, the second cable 280 extends from the point of attachment 232 on the second door 246, through the aligned handle slots 225 and then to the entry side 221 of the cable guide mechanism 205 in an essentially straight line that is substantially parallel with the longitudinal edges 287 of the trap. From the entry side 221, the cable curves over the closed face 217 of the guide mechanism and then out the exit side 223 thereof. The exit side 223 of the guide mechanism 205 is preferably in substantial alignment with the point at which the second cable connects to the set lever so that the door and set lever portions 281, 285 of the second cable run generally parallel, with one another. The second cable can be attached to the set lever by an eyelet (not shown) similar to eyelet 86 used to attach the first cable.

The cable management component may alternatively be embodied as a structure separate from the handle, such as an eye-hook or other ring-forming structure through which the second cable may be passed to ensure proper alignment thereof.

Figure 15A:
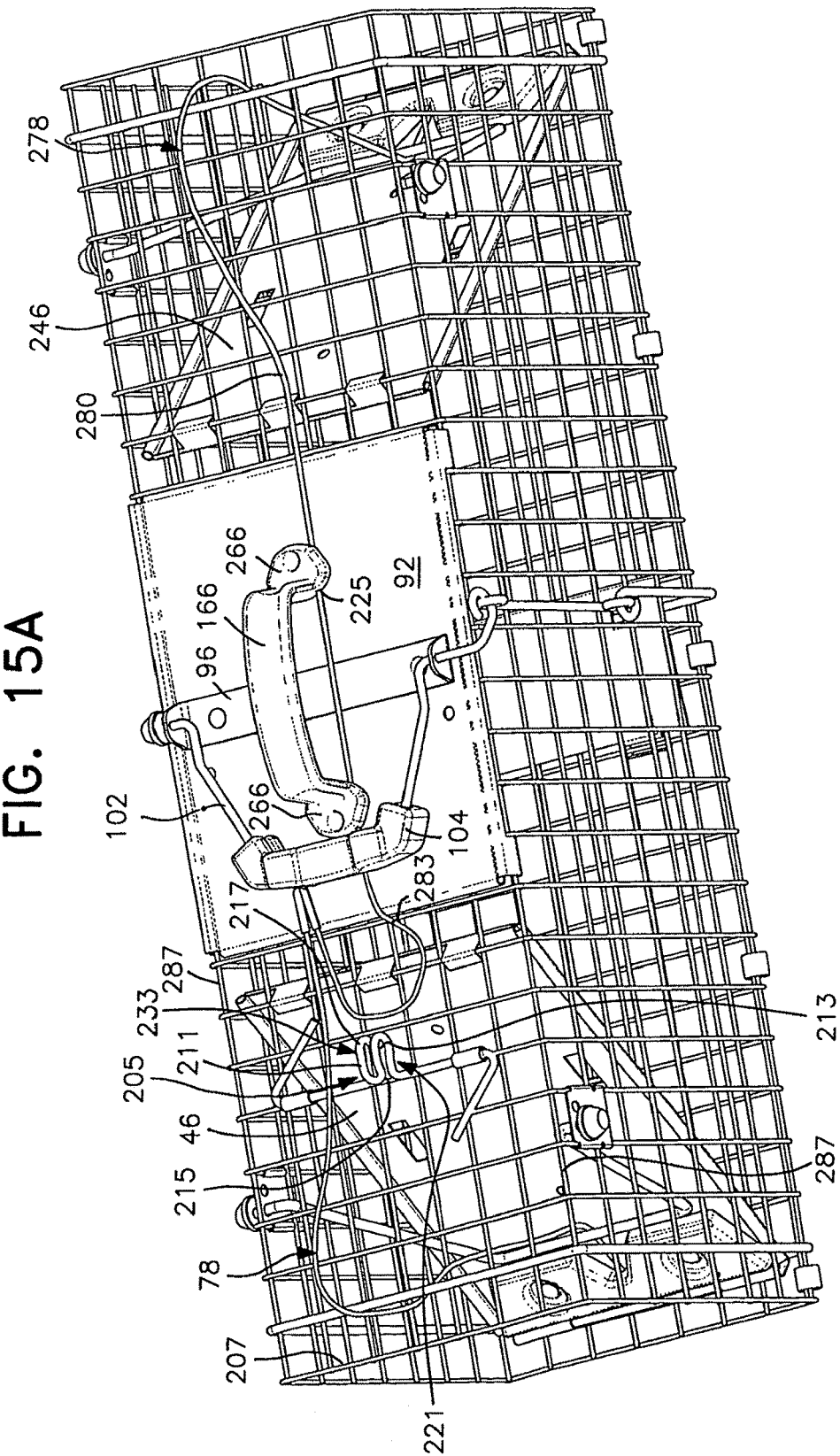
FIG. 15A is a perspective view of a two-door-opening trap shown in the tripped condition in accordance with the present invention, with an over-center set mechanism of the type shown and described in FIGS. 1 and 4.
Figure 15B:
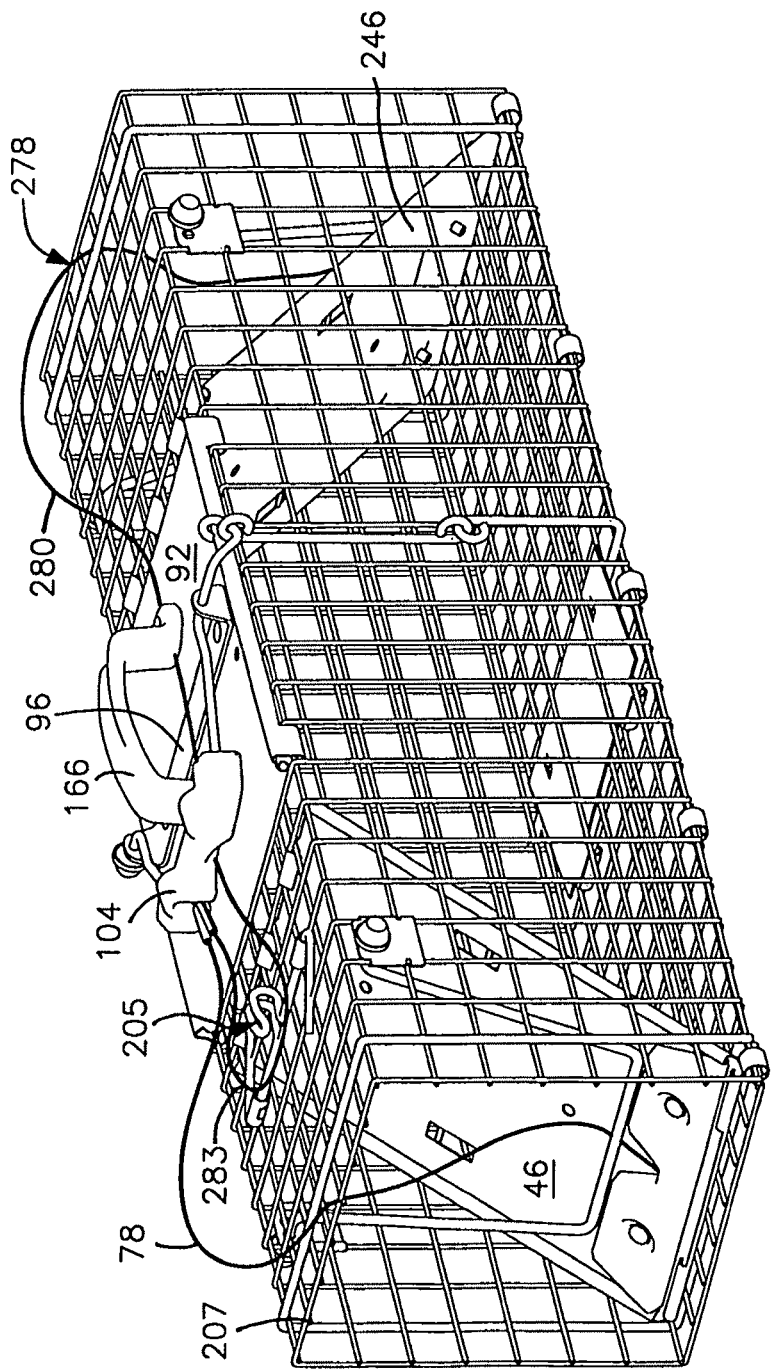
FIG. 15B is another perspective view of the trap shown in FIG. 15A and from the same side, illustrating the slack in the cables when the trap is not set.
Figure 15C:
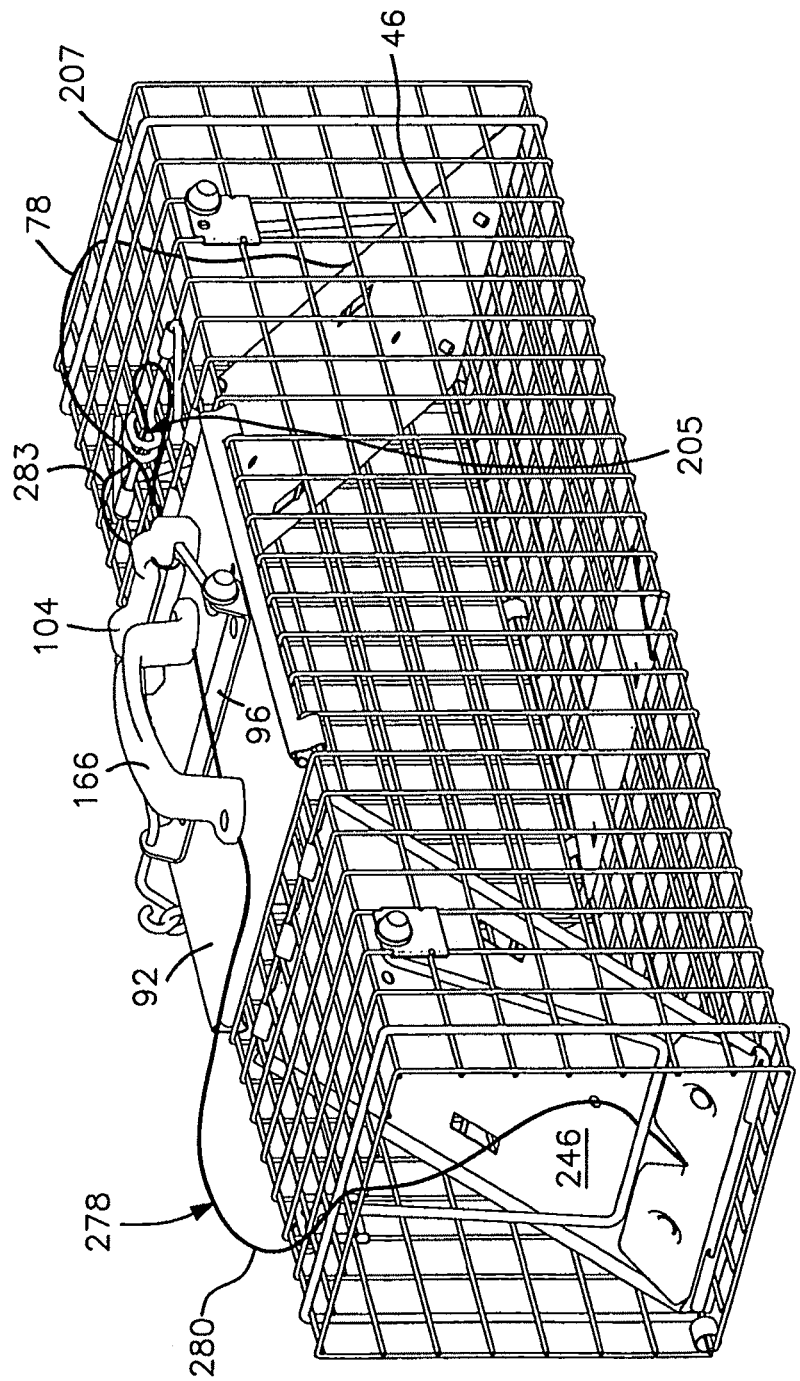
FIG. 15C is a perspective view of the trap shown in FIG. 15B from the opposite side.

In the unset condition shown in FIGS. 15A, 15B and 15C, the set lever 102 is adjacent the first door 46 and the cables 80, 280 are not tensioned. The second cable 280 passes from the point of attachment 282 on the second door 246, through the handle slots 225 and then into the curved portion 283 where the second cable doubles back to its connection point on the set lever 102.

Figure 16:
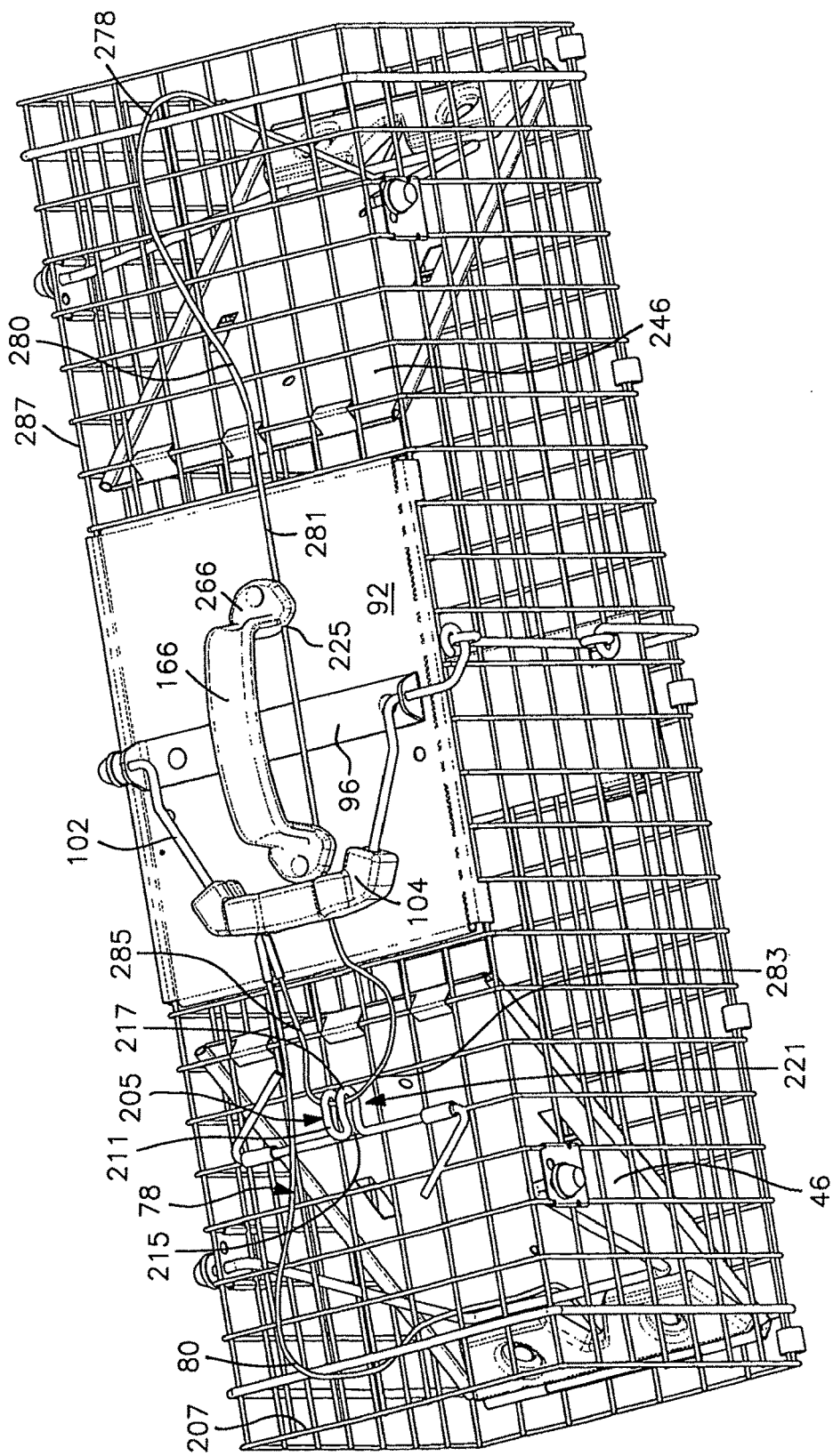
FIG. 16 is a perspective view of the trap of FIG. 15 just prior to being set in the two-door-opening configuration.

To set the trap for two-door-opening operation, the curved portion 283 of the second cable is looped over the cable guide mechanism 211 to place the second cable in the channel 213 as shown in FIG. 16. Both trap doors 46, 246 are then configured to be opened when the trap is set by moving the set lever toward the second, door 246. The first door 46 is opened through direct tensioning of the first cable 80 which is connected to the first door 46 and movable with the set lever as has already been described. The second door 246 is similarly lifted by tensioning of the second cable 280 which draws the second cable through the cable guide channel 213, from the entry side 221 to the exit side 223 thereof, as the set lever is moved away from the cable guide 205 to the set position. The trap as set in the two-door-opening configuration is shown in FIG. 17.

The two-door trap can also be used as a one-door trap, providing the user with versatility in operation. For one-door-opening operation, the trap is taken from the unset position shown in FIGS. 15A-15C, in which the curved portion 283 of the second cable is not engaged with the cable guide mechanism 205, to the position shown in FIG. 18 by moving the set lever 102 toward the second door 246. Because the second cable is not engaged, movement of the set lever 102 opens only the first door 46 while the second door 246 remains closed.

It is to be understood that the present invention is not limited to the illustrated embodiments described herein. Modifications and variations of the above described embodiments of the present invention are possible as appreciated by those skilled in the art in light of the above teachings.

What is claimed is:

1. An animal trap comprising:
   an animal enclosure having a roof and first and second animal access openings into an interior sized to receive an animal to be trapped;
   a first door movably mounted at the first access opening, the first door operative in an opened position to reveal the first animal access opening and in a closed position to block the first animal access opening;
   a second door movably mounted at the second access opening, the second door operative in an opened position to reveal the second animal access opening and in a closed position to block the second animal access opening;
   a first elongated member having first and second ends, the first end being secured to the first door;
   a second elongated member having first and second ends, the first end of the second elongated member being secured to the second door;
   said trap configured to operate as either a one-door-opening trap with said first elongated member acting upon the first door to open said first door, or as a two-door-opening trap with said first and second elongated members acting upon said first and second doors for opening thereof, respectively;
   a guide mechanism mounted to the animal enclosure and configured to engage said second elongated member when said trap is set for two-door-opening operation;
   a set mechanism having a set position and a tripped position, the second ends of both of the elongated members being secured to said set mechanism, movement of said set mechanism to the set position exerting force on at least said first elongated member to open at least said first door; and a trip mechanism associated with the animal enclosure and configured to actuate movement of the set mechanism from the set position to the tripped position in response to an animal inside the animal enclosure, said movement of the set mechanism from the set position to the tripped position releasing tension on at least the first elongated member to enable at least the first door to move from the opened position to the closed position thereby trapping the animal in the animal enclosure.

2. The animal trap of claim 1, wherein movement of said set mechanism to the set position exerts force on both said first elongated member and said second elongated member to open both said first door and said second door, respectively, when the trap is operating as a two-door-opening trap.

3. The animal trap of claim 2, wherein said trip mechanism, upon actuating movement of the set mechanism from the set position to the tripped position, which releases tension on both the first elongated member and the second elongated member, initiates closure of both doors substantially simultaneously.

4. The animal trap of claim 1, wherein said guide mechanism is a wire-form hook having an opening facing the first door and a closed face nearest the set mechanism, said second elongated member entering said opening and being held against said closed face when said second elongated member is tensioned between its first and second ends.

5. The animal trap of claim 1, wherein said set mechanism includes:
a set lever bracket mounted on the roof transverse to a longitudinal direction of the animal enclosure;
a set lever supported on said bracket so as to be movable between said set and tripped positions, said second ends of said elongated members being secured to said set lever.

6. The animal trap of claim 1, wherein said trap further includes at least one elongated member management element mounted on the top of the trap to direct the second elongated member toward the guide mechanism.

7. The animal trap of claim 6, wherein said trap includes a longitudinally extending handle having handle bases mounted on said set lever bracket, said elongated member management element including slots formed in said handle bases and extending longitudinally therethrough and in alignment with one another to receive said second elongated member which passes therethrough.

8. The animal trap of claim 7, wherein said slots are substantially in longitudinal alignment with a point at which said second elongated member is secured to the second door.

9. The animal trap of claim 1, wherein said set mechanism is pivotally movable.

10. The animal trap of claim 1, wherein said first and second elongated members are cables.

11. An animal trap comprising:
an animal enclosure having a roof and first and second animal access openings into an interior sized to receive an animal to be trapped, said trap configured to operate as either a one-door-opening trap or as a two-door-opening trap;
a first door movably mounted at the first access opening, the first door operative in an opened position to reveal the first animal access opening and in a closed position to block the first animal access opening;
a second door movably mounted at the second access opening, the second door operative in an opened position to reveal the second animal access opening and in a closed position to block the second animal access opening;
a first elongated member having first and second ends, the first end being secured to the first door and acting upon the first door when the trap is configured to operate as either the one-door-opening trap or the two-door-opening trap;
a second elongated member having first and second ends, the first end of the second elongated member being secured to the second door but operative to act upon the second door only when the trap is configured to operate as the two-door-opening trap;
a set mechanism having a set position and a tripped position, the second ends of both of the elongated members being secured to said set mechanism, movement of said set mechanism to the set position exerting force on said first elongated member to open said first door when the trap is configured to operate as the one-door-opening trap or as the two-door-opening trap, and movement of said set mechanism to the set position exerting force on said second elongated member to open said second door only when the trap is configured to operate as the two-door-opening trap; and
a trip mechanism associated with the animal enclosure and configured to actuate movement of the set mechanism from the set position to the tripped position in response to an animal inside the animal enclosure, said movement of the set mechanism from the set position to the tripped position releasing tension on the first elongated member to enable the first door to move from the opened position to the closed position when the trap is configured to operate as the one-door-opening trap or as the two-door-opening trap, and movement of said set mechanism from the set position to the tripped position releasing tension on the second elongated member to enable the second door to move from the opened position to the closed position only when the trap is configured to operate as the two-door-opening trap.

12. The animal trap of claim 11, further comprising a guide mechanism mounted to the animal enclosure and configured to engage said second elongated member when said trap is set for two-door-opening operation.

13. The animal trap of claim 12, wherein said second elongated member is a cable and said guide mechanism is a cable guide mounted on the roof of the animal enclosure and configured to engage with and change a direction of said cable when said trap is set for two-door-opening operation.

14. The animal trap of claim 13, wherein said cable guide is a wire-form hook having an opening facing the first door and a closed face nearest the set mechanism, said cable entering said opening and being held against said closed face when tensioned between its first and second ends.

15. The animal trap of claim 14, wherein said trap further includes at least one cable management element mounted on the top of the trap to direct the cable toward the cable guide.

16. The animal trap of claim 15, wherein said trap includes a longitudinally extending handle having handle bases mounted on said set lever bracket, said cable management element including slots formed in said handle bases and extending longitudinally therethrough and in alignment with one another to receive said cable which passes therethrough.

17. The animal trap of claim 16, wherein said slots are substantially in longitudinal alignment with a point at which said cable is secured to the second door.

18. The animal trap of claim 12, wherein said first and second elongated members are flexible members.

19. The animal trap of claim 18, wherein said guide mechanism is mounted on the roof of the animal enclosure and is configured to engage with and change a direction of said flexible second elongated member when said trap is set for two-door-opening operation.

20. The animal trap of claim 11, wherein said trip mechanism initiates closure of both doors substantially simultaneously when the trap is operating as a two-door-opening trap.

* * * * *